ALLEN I. PERLIN
WILLIAM A. SCOTT
JAMES A. LA MAR
INVENTORS

BY Robert T. Gillman
ATTORNEY

ALLEN I. PERLIN
WILLIAM A. SCOTT
JAMES A. LA MAR
INVENTORS

BY Robert T. Killman
ATTORNEY

A. I. PERLIN
W. A. SCOTT
J. A. LA MAR
INVENTORS

BY Robert L. Killman
ATTORNEY

ALLEN I. PERLIN
WILLIAM A. SCOTT
JAMES A. LA MAR
INVENTORS

BY Robert T. Killman
ATTORNEY

Feb. 1, 1966 A. I. PERLIN ETAL 3,233,221

BINARY CODE SELECTIVE CALLING SYSTEM HAVING SYNCHRONIZED CLOCK OSCILLATORS AT THE TRANSMITTER AND RECEIVER

Filed Oct. 26, 1960 6 Sheets-Sheet 5

ALLEN I. PERLIN
WILLIAM A. SCOTT
JAMES A. LA MAR
INVENTORS

Robert T. Kellman
ATTORNEY

United States Patent Office 3,233,221

Patented Feb. 1, 1966

3,233,221

BINARY CODE SELECTIVE CALLING SYSTEM HAVING SYNCHRONIZED CLOCK OSCILLATORS AT THE TRANSMITTER AND RECEIVER

Allen I. Perlin, Cockeysville, and William A. Scott and James A. La Mar, Lutherville, Md., assignors to The Bendix Corporation, Towson, Md., a corporation of Delaware Filed Oct. 26, 1960, Ser. No. 65,154
11 Claims. (Cl. 340—147)

The present invention relates to selective calling systems. More particularly it relates to means for selecting and signalling an individual station operating in a network of stations, all of which are tied together by a common communication channel.

The present invention is intended for use in ground to aircraft communication systems which are characterized by a single communication channel linking the ground control center with a plurality of aircraft. Heretofore, it has been necessary for an aircraft pilot to monitor continuously the transmissions of the control center. Although generally these transmissions are addressed to individuals, each of the receiving stations in the network must be alert to every call so that the called aircraft will recognize and respond to the summons. Such a burden overloads the already heavily taxed senses of a pilot. Therefore, prominent amongst the objects of this invention is the provision of means for eliminating constant monitoring of a radio receiver by an operator. An aircraft pilot relieved of the burden of radio attendance is then capable of concentrating on other vital aspects of the flight.

Although ground to air communications have been mentioned as a field particularly suited for application of the present invention, obviously many other opportunities exist for its practice. To mention but a few, police and taxicab radio networks and similar networks employed by service organizations; selective monitoring of telemetering equipment; and selective contact with radio navigational aids, for example, distance measuring systems. While several of the objects of the invention may be framed in terms of ground to air communication system, they are equally applicable to alternative fields of practice.

Included in the more specific objects of the invention is the provision of a selective calling system capable of reliably establishing contact with a desired station even at noise levels which render intelligible communication difficult or impossible.

Another object is to provide a selective calling system capable of establishing contact with an individual station, a selected group of stations, or all stations within the network according to the desire of the calling station.

An additional object is to provide a selective calling system capable of operating within the limited bandwidth of voice radio communiactions systems.

A further object of the invention is to provide a calling system capable of establishing contact with a selected station with scarecly perceptible delay.

Still another object of the invention is to provide a system employing call signs in the form of binary digits thereby simplifying and speeding the transmission of call signals.

Yet another object of the invention is to provide a binary type selective calling system in which the various receiving stations are self-synchronizing with the transmitting station thus eliminating the necessity of transmitting timing signals.

An additional object is to provide a system possessed of the foregoing attributes in which major and varied functions are performed by modular substructures, thereby simplifying production and maintenance problems.

These and many other objects and attendant advantages will be evident as an understanding of the invention is gained by study of the following detailed description and the accompanying drawings.

Briefly, the present invention comprises means at the transmitting station for converting a call sign from a combination of decimal numbers or letters into binary form. The converted call sign is then broadcast by the transmitter as a series of tones representing the ones and zeros composing the binary equivalent of the call sign. All of the stations within the network receive the transmitted call sign and automatically test the call sign against their own preassigned call. Only the station having the transmitted call sign will alert its operator to an incoming call. The remainder of the stations, having tested the call sign and found it to be "false," give no indication to their operators that a message is in progress.

In the drawings:

FIG. 1 shows the invention in functional block diagram form. The network comprises a transmitter 10 located at the control center and a plurality of remotely located receivers 12, only one of which is shown.

Figures 1, 5:
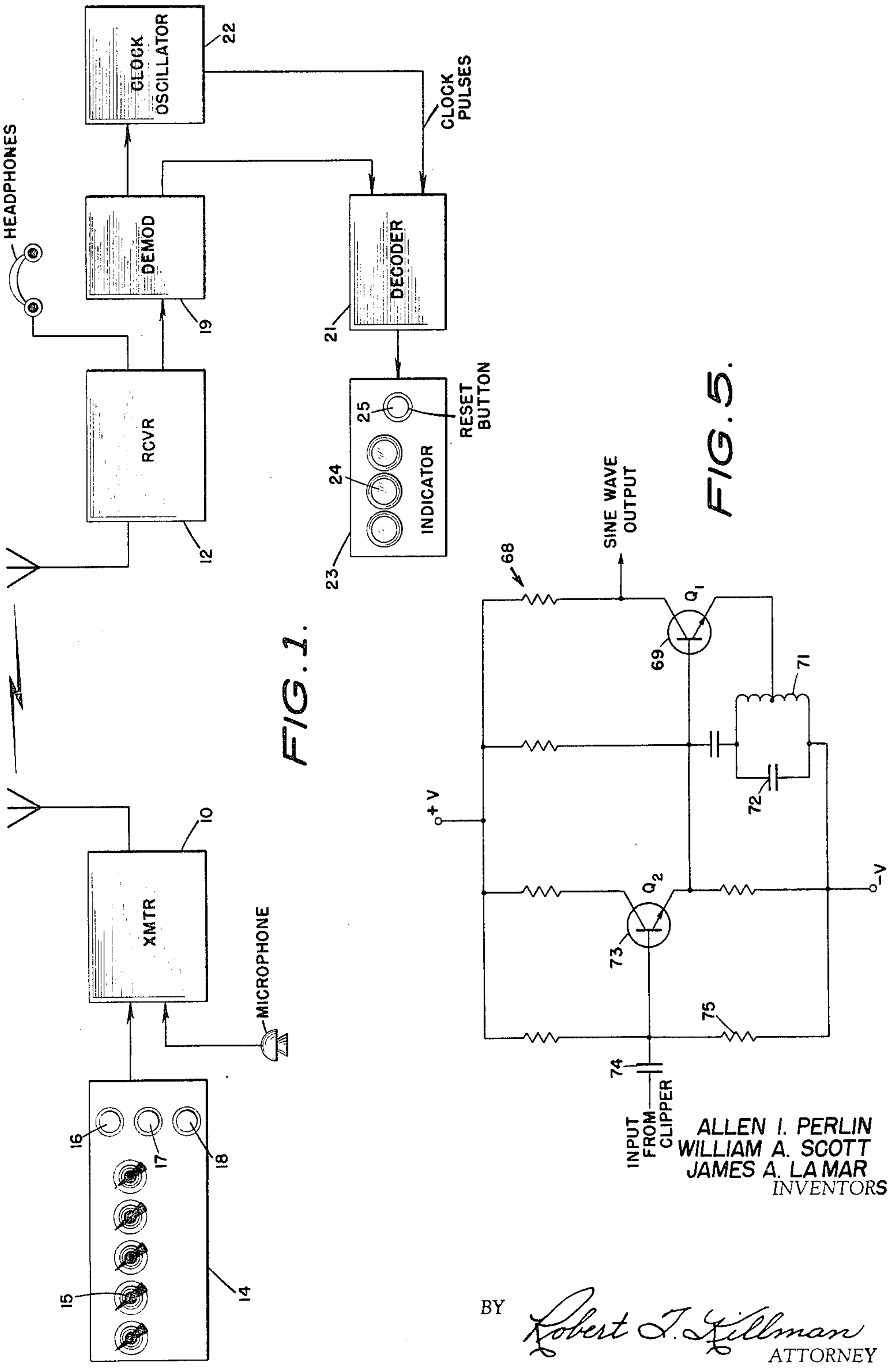
FIG. 1 is a functional block diagram of the invention showing broadly both the ground and airborne elements of the system.
FIG. 5 is a schematic diagram of the gated oscillator forming an important element of the airborne station.

A control panel 14 supplies the transmitter 10 with a series of tones representing the call sign of the desired station. Station selector means are provided at the control panel 14 for entering the call in a form familiar to the operator. As shown, these means comprise a series of rotary decade switches 15 set to the desired call. Obviously pushbutton switches, keyboards and the like may be substituted for the rotary switches 15.

Three mode selection switches 16, 17 and 18 are provided for transmitting first, by switch 16, a call to the station selected by the rotary switches 15, or by means of switch 17, a call to a predetermined group of stations, or a call to all network stations, by means of switch 18.

After selection of the desired call and actuation of switch 16, means within control panel 14 translate the decimal call into binary form. The binary call appears as a series of audio tones which modulates the output of transmitter 10. At the remote receiver 12, the transmitted signal is amplied in the usual manner and supplied to a demodulator 19 which recovers the tone content of the signal and develops an appropriate chain of pulses corresponding to the ones and zeros of the transmitted call. The output of demodulator 19 is supplied to a decoder 21. Demodulator 19 also supplies a synchronizing output to a clock oscillator 22 which provides necessary timing pulses for decoder 21. Employing a portion of the transmitted call sign as a synchronizing signal for oscillator 22 renders unnecessary the transmission of clock signals from the control station. The construction of demodulator 19 is thereby simplified and the bandwith occupied by the call sign is reduced.

The decoder 21 tests the received call sign against the preassigned call sign of the receiving station. If the received call sign is identical to the call sign assigned to the receiving station, decoder 21 supplies an actuating signal to an indicator 23 alerting the receiving station operator to the incoming call by illuminating one of three signal lamps 24. Three lamps are shown for the purpose of indicating the call mode selected by the transmitter operator. For example, one lamp designates a station call, a second lamp designates a group call and the remaining lamp designates an emergency call. The output of decoder 21 may be employed simultaneously or alternatively to initiate the operation of squelch circuits, audible alarms, etc. A reset button 25 is included for clearing the indicator after reception of a call. From the general description of the external aspects of the system of this invention, it will be clear that the transmitting station operator need only set the call sign of the desired receiving station and push an appropriate mode selection button to initiate the call. No monitoring is required of the receiving station operator in order to be alert to a call. He has merely to take occasional note of the indicator 23 and may even ignore that device if an audible indicator is employed.

Before describing the operation of the invention in detail, several constraints upon its operating characteristics will be set forth. First, it is desirable that the bandwidth occupied by the call signal be within the passband usually available for voice modulated radio communications systems. The available audio passband is normally from 300–3000 cps. and therefore the invention has been designed to operate within these limits. Related to the bandwidth requirements is the time required to transmit the call sign and the number of individual call signs available. The latter two factors have been set as one-half second for transmitting the call and as 100,000 individual calls.

As will later become apparent, the capabilities of the system can be expanded without change in its principle of operation. It should therefore be understood that specified data rates and call sign capacity is intended merely to illustrate one embodiment of the invention.

Figure 2:
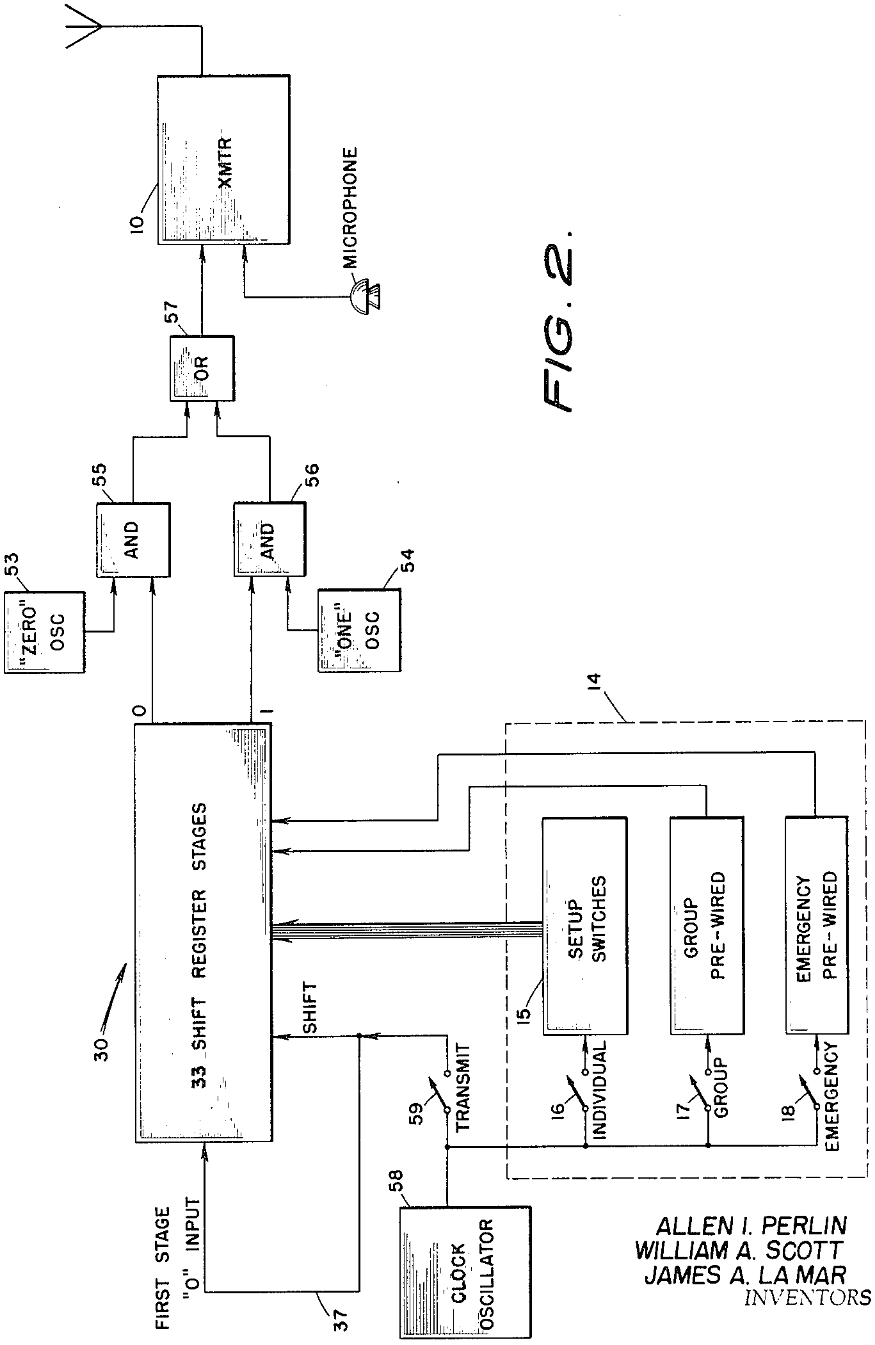
FIG. 2 is a functional block diagram illustrating the ground station in greater detail than FIG. 1.

Referring to FIG. 2, illustrating the ground station in greater detail, a call sign is converted from decimal to binary form by means of a serial shift register 30. Thirty-three stages are provided in shift register 30 to generate a message composed of five five-bit words and a sixth word of eight bits. Each of the five bit words comprises one decimal number of the call sign. The first bit in a word is always a "one" and is used for synchronizing clock oscillators at the receiving station. The remaining four bits of the word constitute the binary equivalent of one decimal number. The sixth word of eight bits consists of eight zeros and is the first word transmitted in order to initiate the operation of all receiving station decoders, as will later be described. The eight final stages of register 30, being the first cleared, are therefore pre-wired to be reset at zero. The selector switches 15 control the resetting of the twenty-five preceding stages to the binary equivalent of the desired decimal call sign.

Figure 3:
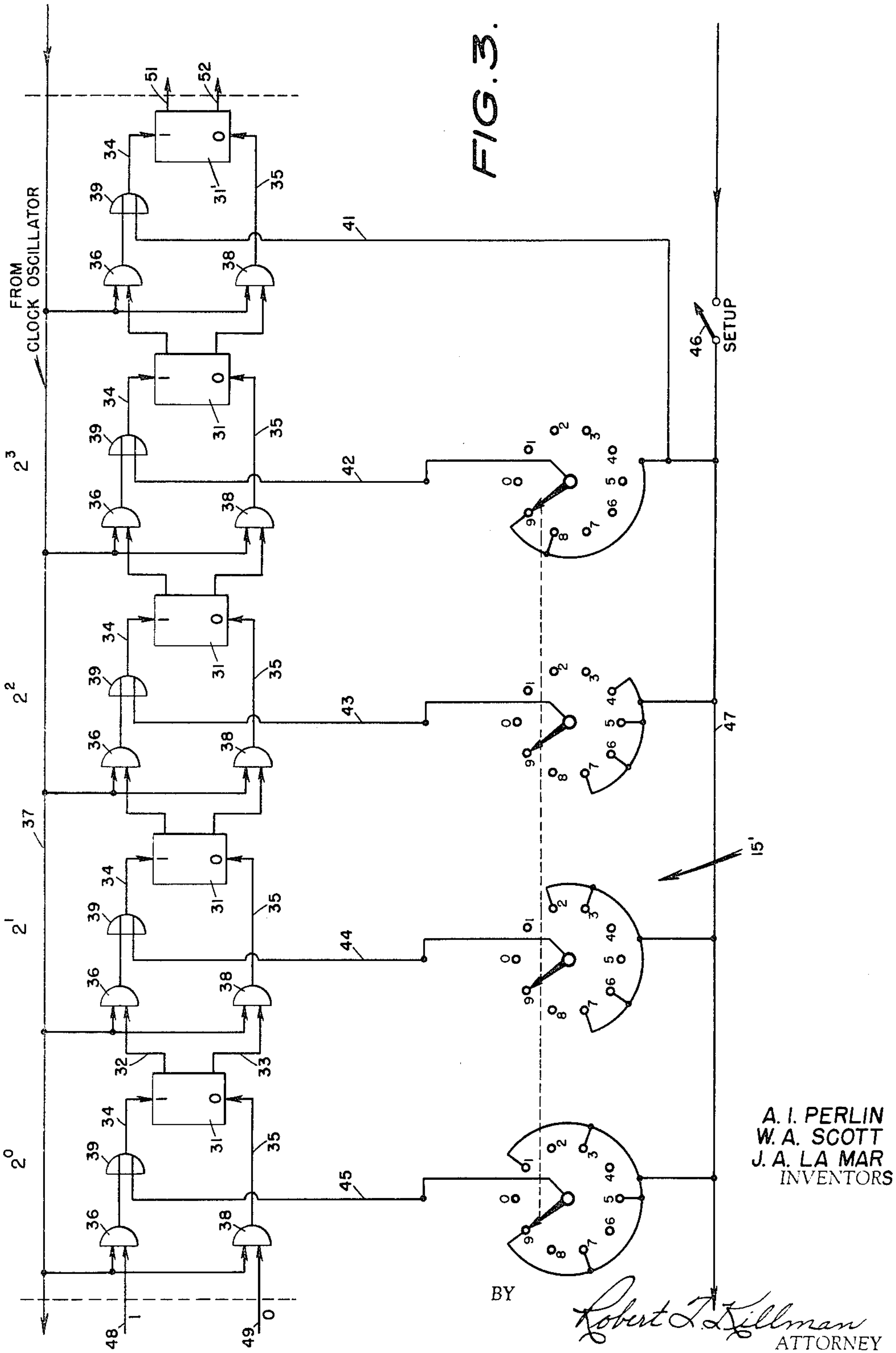
FIG. 3 is a functional block diagram of a portion of the ground station shift register showing the manner of converting a call sign decimal digit into binary form.

FIG. 3 illustrates a typical group of five stages of register 30 capable of generating one five bit word of the call sign. Each register stage 31 consists of a flip-flop having a "one" output line 32, a "zero" output line 33, a "one" reset line 34 and a "zero" reset line 35. Each of the "one" output lines 32 enters separate "and" gates 36 which are also connected to the clock or shift bus 37. Each of the "zero" output lines 33 are connected, together, with lines from clock bus 37, to separate "and" gates 38, when connection is made to the "zero" reset lines 35. The outputs of "and" gates 36 are connected to "or" gates 39 whose outputs are applied to the "on" reset lines 34. Five individual set up lines 41–45 are connected to the "or" gates 39. Energizing lines 41–45 in various combinations results in setting the register to the binary equivalent of the desired decimal number. Proper combination of lines 42–45 is provided by a four-wafer, ten position rotary switch 15′ set to one of the decimal digits of the call sign. An energizing source (not shown) is connected through a switch 46 to a bus 47 to which are connected contacts of switch 15′ in the order necessary to convert the decimal digit to binary form.

Switch 15′ is shown in position to convert the decimal digit nine into the binary equivalent 1001. Initially, all stages of the register are set at zero and no pulses are present on clock line 37. Since it is desired that the word to be transmitted commence with the digit one, set up line 41 of the final register stage 31′ is wired directly to set up bus 47. The decimal digit 9 is the sum of $8+1$, therefore it is necessary to set the $2^3$ flip-flop preceding the final flip-flop 31′, to "one," the $2^2$ and $2^1$ flip-flops to "zero" and the $2^0$ flip-flop, the first in the chain, to "one." Position nine of switch 15′ connects lines 42 and 45 to bus 47. Upon closure of switch 46, the flip-flops 35 will be in the condition, reading from right to left, 11001.

Additional words of the call sign are supplied from five stage registers constructed identically to FIG. 3 and series connected by applying the "one" and "zero" outputs of the final stages of each to the "and" gates of the first register in the succeeding five stage register. For example, lines 48 and 49 of FIG. 3 are connected to lines of a preceding five stage register located similarly to the output lines 51 and 52 of final stage 35′.

Again referring to FIG. 2, the register 30 contains the five-five stage series connected registers followed by eight serial stages for generating the eight bit first word of the message. The latter eight stages differ from the preceding stages only in that presetting means are omitted since the output is always a word of eight zeros.

The "one" and "zeros" of the binary encoded call sign are transmitted by modulating the transmitter 10 by two different audio tones. Two audio oscillators 53 and 54 generate the tones for modulating the transmitter 10 in the sequence determined by the output of register 30. Oscillator 53 supplies an 825 c.p.s. signal to an "and" gate 55. The "zero" output line from the last stage of register 30 forms a second input to gate 55. Gate 55 therefore passes the output of oscillator 53 whenever the last stage of register 30 is in the "zero" condition. The output of oscillator 54 is a 2050 c.p.s. signal which is passed by an "and" gate 56 only when the last stage of register 30 is in a "one" condition. The outputs of gates 55 and 56 are combined in an "or" gate 57 and then applied to the modulator input of transmitter 10. A clock oscillator 58 provides pulses at a 50 c.p.s. frequency for shifting the message out of register 30 and thus transmitting the call. Upon closure of switch 16, corresponding to switch 46 of FIG. 3, energy is supplied through the switches 15 to set up the desired call in register 30. When switch 59 is closed, the clock pulses shift the message from register 30 in the usual manner. As each digit of the message appears in the last stage of register 30 either gate 55 or gate 56 will be actuated to transmit the tone signal representation of the digit.

Figure 4:
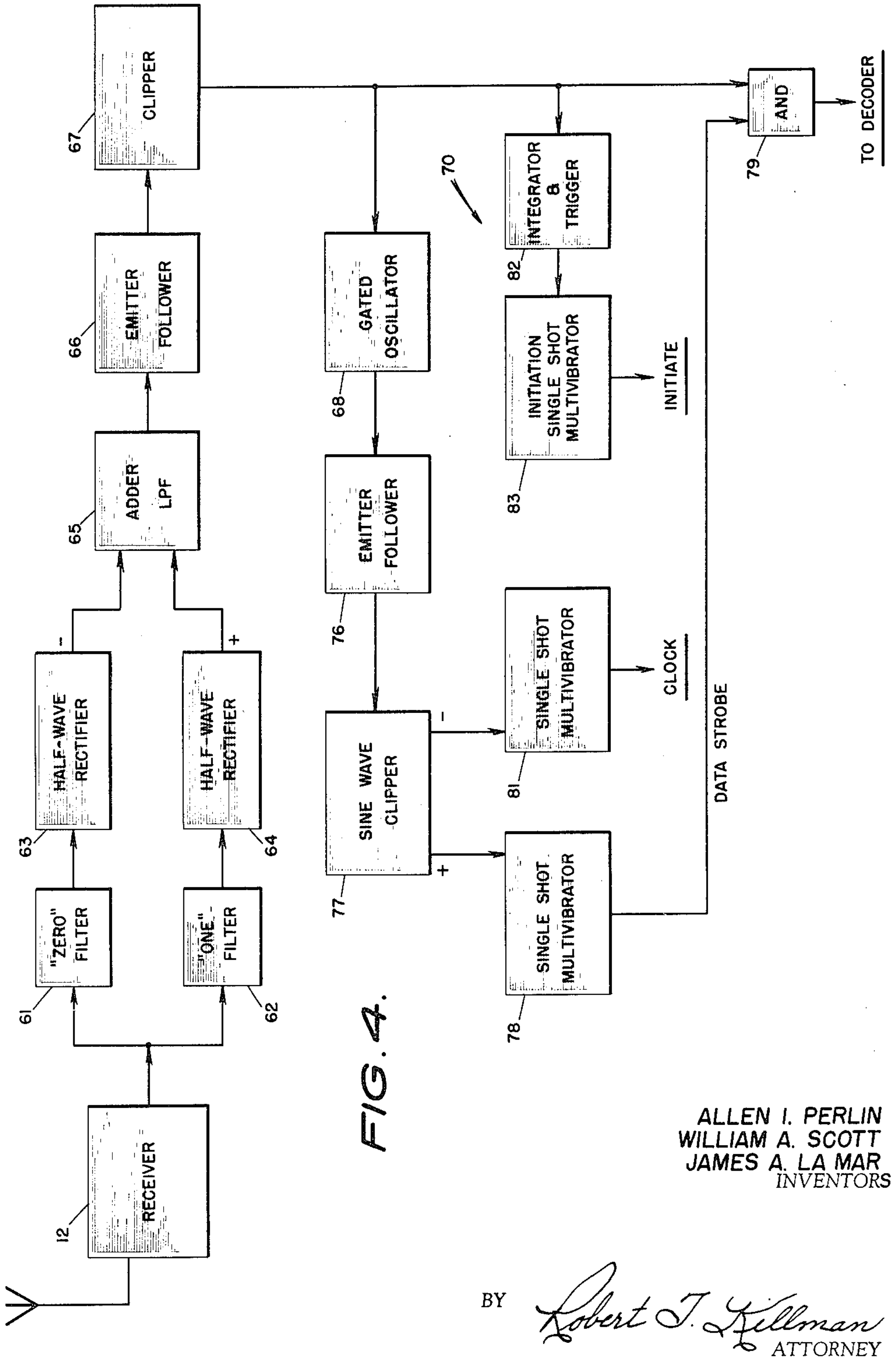
FIG. 4 is a functional block diagram illustrating elements of the airborne station in greater detail than FIG. 1.

FIG. 4 illustrates details of the receiving station demodulator 19 and clock oscillator 22 shown as single blocks in FIG. 1. The audio output of receiver 12, consisting of the tone series representation of the digital call, is applied simultaneously to filters 61 and 62. Filter 61 is tuned to pass the "zero" tone of 825 c.p.s. Filter 62 passes a frequency of 2050 c.p.s. and thus identifies the "one" digits present in the message. A half-wave rectifier 63 is connected to filter 61 to provide a negative polarity output. A second half-wave rectifier 64 is connected to filter 62 to provide a positive polarity output. The outputs of both rectifiers 63 and 64 are summed, filtered and amplified in conventional adding and amplifying circuits 65 and 66. A clipper circuit 67 follows ampifier 66 for the purpose of shaping the amplifier output into a square waveform. When the output of receiver 12 consists of alternating "ones" and "zeros," the output of clipper 67 is a symmetrical square wave. The square waveform improves the detection of data by eliminating noise induced amplitude excursions.

Clipper 67 synchronizes a gated sine wave oscillator 68 and operates an initiation circuit 70, in addition to supplying the message to decoder circuits later to be described. The gated oscillator 68, illustrated in detail in FIG. 5, comprises a first transistor 69 connected in a Hartley type oscillator circuit including an inductor 71 and a capacitor 72. The values of inductor 71 and capacitor 72 are chosen to establish a frequency of oscillation equal to the frequency of the ground station clock oscillator. A second transistor 73, normally biased to cut-off, is connected across the oscillator tank circuit. Input to the base of transistor 73 is from clipper 67 (FIG. 4) through a short time-constant differentiating circuit comprising capacitor 74 and resistor 75. A positive output from clipper 67, representing a "one," will cause transistor 73 to conduct heavily for a time which is very small compared with the period of oscillator 68. Conduction of transistor 73 causes transistor 69 to saturate, thereby ending oscillation and causing the oscillator output to fall to its peak negative value. Since transistor 73 remains conducting for only a very short time, its effect on the period of oscillator 68 is negligible. Consequently, every "one" output of clipper 67 causes oscillator 68 to commence operation at its negative peak value within a negligibly short time of the appearance of the "one." Oscillator 68 is thus synchronized with the ground station clock oscillator at least once during every word of the message.

Again referring to FIG. 4, the output of oscillator 68 is amplified in an emitter follower 76 and shaped into a square wave by a sine wave clipper 77. The positive half cycle of the output of clipper 77 triggers a single-shot multivibrator 78, the output of which is combined with the output of clipper 67 in an "and" gate 79. The negative half cycle of the output of clipper 77 triggers a single-shot multivibrator 81, which serves as the source of clock pulses.

Figure 6:
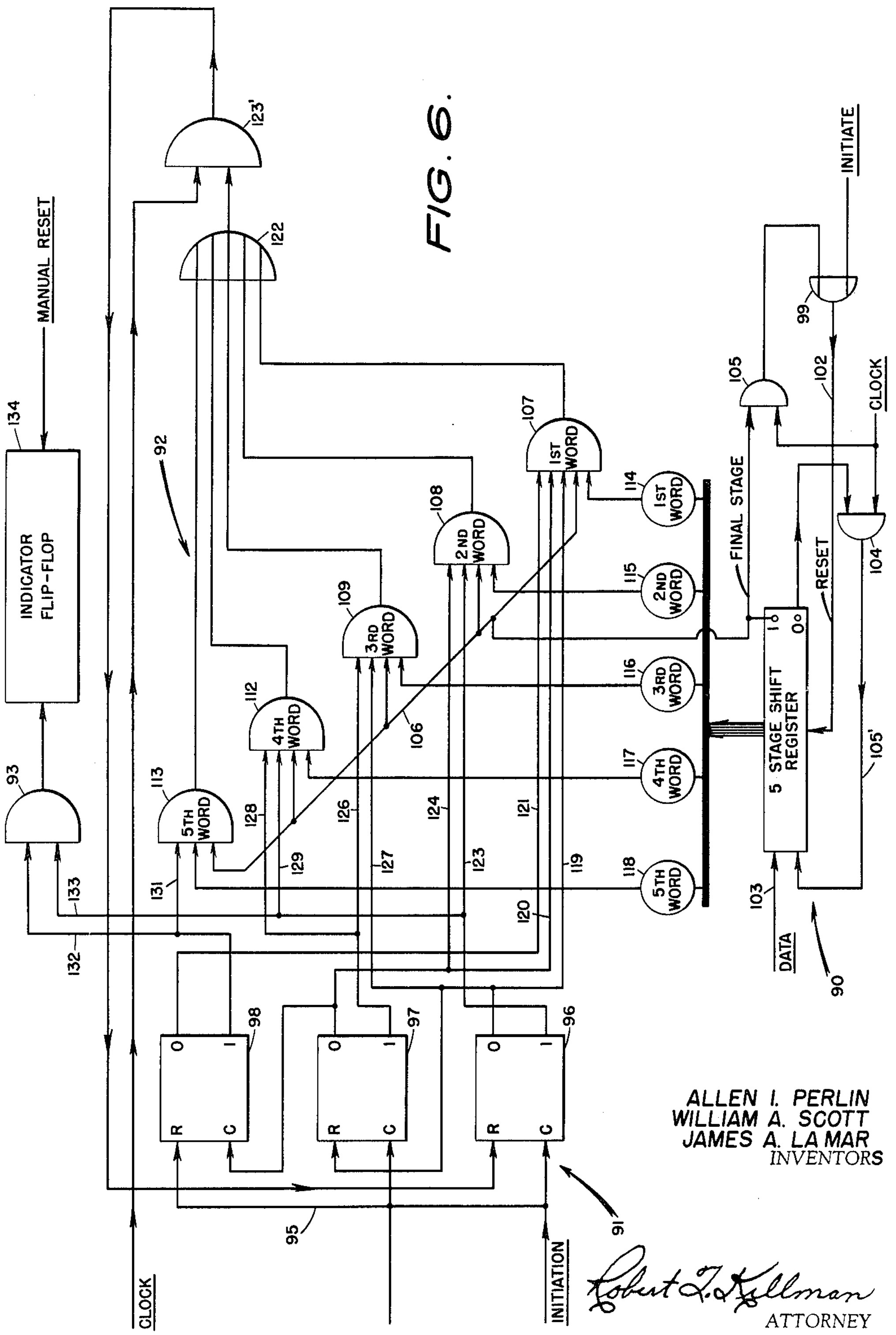
FIG. 6 is a functional block diagram of the decoder circuits of the airborne station.

The output of clipper 67 is fed to an Miller type integrator and trigger circuit 82. The trigger level of integrator 82 is set at such a value that a negative output from clipper 67 having a time duration of six bit intervals is required for the integrator output to reach the trigger level. Since the maximum number of zeros in any word of the message is four, a trigger output from the integrator will only occur following the reception of the eight zero word which commences every call. The trigger output of integrator 82 is applied to an initiation single-shot multivibrator 83 which supplies a pulse for clearing the register and word counter circuits of the decoder 21 (FIGS. 1 and 6). The output of multivibrator 78 enables "and" gate 79 so that the data output of clipper 67 is sampled approximately in the middle of the bit period. Clipper 67 is thus enabled to reach a steady state value for each data bit before the data is supplied to the decoding circuits.

FIG. 6 illustrates details of the decoder 21. The decoder may be subdivided into three principal elements, a five stage shift register 90, a word counter 91, and decoder logic circuits 92. Each of the five bit words received is entered in the shift register 90. The word counter 91 selects an element of the logic 92 corresponding to the word position in the message. If the word tests true in the logic 92, the word counter 91 advances one count to select the logical element for the next word in the message. If all five words test true, the counter will have advanced to a count of five or 101. A gate 93 is arranged to open upon a count 101 to actuate the indicator 23 of FIG. 1 or a substitute alerting device.

Each message commences with eight zero bits which cause multivibrator 83 of FIG. 4 to generate an initiation pulse. The initiation pulse is applied to the reset line 95 of counter 91 setting flip-flops 96, 97 and 98 therein to zero. The initiation pulse is also applied through an "or" gate 99 to the reset line 102 of shift register 90 setting all five stages therein to zero. At the conclusion of reception of the eight zero bit word, the first word of the call sign, taken from "and" gate 79 (FIG. 4) is applied to the data input line 103 of register 90. Pulses from clock multivibrator 81 (FIG. 4) are applied together with the zero output of the final stage of register 90 through an "and" gate 104 to the shift line 105′. So long as the final stage of register 90 is in a "zero" condition clock pulses will advance the input data through successive register stages. When the final stage of register 90 shifts to a "one" condition the register will contain a complete five digit word. An "and" gate 105 is then enabled so that the next clock pulse will be transferred to the reset line 102 through "or" gate 99 clearing the register in preparation for the next word of the message.

The final stage "one" output is also applied through line 106 to five "and" gates 107–109, 112 and 113 forming the logic circuit 92. Thus none of the logic gates will be operative unless register 90 contains a complete word. Five switches 114–118, connected to various stages in register 90 in a manner later to be described, are set to the decimal digits of the receiving station call sign. When the first full word has been received line 106 enables gate 107. Lines 119, 120 and 121 connected from the "zero" outputs of flip-flops 96, 97 and 98 also enable gate 107 since the word counter 91 stands at 000. Then if the binary word stored in register 90 corresponds with the decimal setting of switch 114, gate 107 opens to pass an output through an "or" gate 122 to enable an "and" gate 123′. The clock pulse following the storage of a complete word in register 90 clears the register and passes gate 123′ to advance word counter 91 to the count 001. The "one" output of flip-flop 96 and the "zero" output of flip-flop 97 is applied through line 123 and line 124 to the second word gate 108. Gate 108 will then be enabled when a full word is stored in register 90 and the other word gates 107, 109, 112 and 113 will be inhibited. If the second word tests true, gate 123′ is again enabled allowing the clock pulse to advance word counter 91 to the count 010. The "one" output of flip-flop 97 and the "zero" output of flip-flop 96 connected through lines 126 and 127 enable the third word gate 109 upon the appearance of the third complete word in register 90. If the third word tests true, word counter 91 advances to the count 011, thus enabling the fourth word gate 112 by means of lines 128 and 129 connected from the "one" outputs of flip-flops 96 and 97. If the fourth word tests true, counter 91 is advanced to the count 100. The "one" output of flip-flop 98 is connected through line 131 to the input of the fifth word gate 113 thereby enabling that gate upon a count of 100. If the fifth word tests true, counter 91 advances to a count of 101. This count will be reached only after the reception of five true words and is therefore used as the actuation signal for the indicator 23 (FIG. 1). Connection from the "one" output of flip-flop 98 and the "one" output of flip-flop 96 through lines 132 and 133 enables "and" gate 93 to sense the count of 101 and thus trigger an indicator flip-flop 134. The output of flip-flop 134 then changes state from say an "off" condition to an "on" condition. The on condition of flip-flop 134 can be used to operate a lamp in indicator 23 or to operate any other desired means of alerting the receiving station operator to an incoming call.

Figure 7:
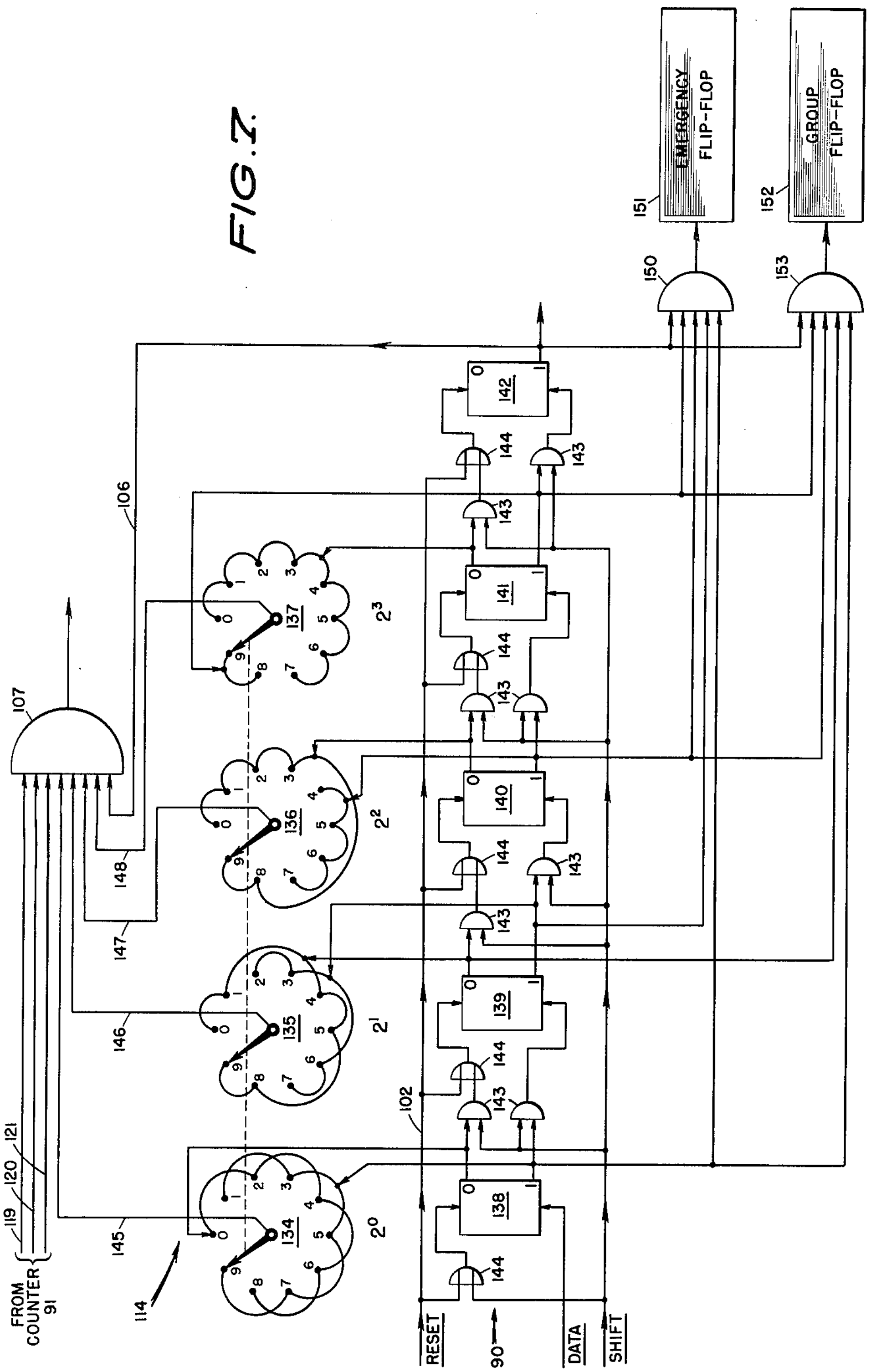
FIG. 7 is a functional block diagram of a portion of the airborne decoder circuits showing the manner of connecting a logic element to the receiving station shift register so as to respond to the binary equivalent of a selected decimal digit.

FIG. 7 illustrates the connection of switch 114 to the shift register 90. Switch 114 comprises a ten position rotary switch having four wafers 134–137. The five stages 138–142 of shift register 90 are connected in a conventional manner using "and" gates 143 to which shift pulses are applied and "or" gates 144 to which the reset line 102 is connected. Data pulses from gate 79 (FIG. 4) are applied to the "one" input of stage 138. A positive or "one" pulse appearing at the data input of register 90 causes the first stage output to assume a "one" condition.

A negative or "zero" pulse does not change the state of the output of stage 138. Clock pulses passing through "and" gate 104 shift the input data along the line of stages until the output of final stage 142 becomes "one", thereby indicating that a complete word is stored in the register and enabling the first word gate 107 through line 106. The four arms of switch wafers 134–137 are connected through lines 145–148 to gate 107. Lines 119–121 from word counter 91 (FIG. 6) are also connected to gate 107. In order for gate 107 to be enabled and thus indicate a true word, all input lines to the gate must be "up" or true. Consequently, the "one" output of stage 138 is connected to those contacts on switch wafer 134 wherein the binary equivalent of the desired decimal requires the lowest valued or zero order bit to be one. The "zero" output of stage 138 is connected to all other contacts on wafer 134. Similarly, the "one" output of stage 139 is connected to those contacts of wafer 135 wherein the binary equivalent of the desired decimal contains a one for the bit representing the first power of the radix 2. The remaining contacts of wafer 135 are connected to the zero output of stage 139. The contacts of wafers 136 and 137 are connected to the "one" and "zero" outputs of stages 136 and 137 with similar regard to the condition those stages will assume when the binary equivalent of a decimal is stored therein.

Switch 114 is illustrated in position 9. In order for gate 107 to open, the binary equivalent of 9, 1001, must be stored in register 90. Accordingly, contact 9 on wafers 134, 135, 136 and 137 are connected, respectively, to the "one" output of stage 138, the "zero" outputs of stages 139 and 140 and the "one" outputs of stage 141. Upon the entry of the number 11001 in register 90, lines 106, and 145–148 will all test true thereby opening gate 107. Switches 115–118 of FIG. 6 are each connected to register 90 in a manner similar to the connection of switch 114. Thus a full five decimal digit address capacity is provided for the system with the use of only a five stage shift register.

The connections to register 90 which provide the group and emergency alerts of indicator 23 will now be described.

An "and" gate 150 receives an input from the "one" outputs of each of the stages 138–142 of register 90. Gate 150 thus opens on a count of 11111 to trigger a flip-flop 151 which turns on the emergency lamp of indicator 23. The count of 11111 cannot occur in any word of an individual call since such a count is the binary equivalent of fifteen and the highest call digit is nine.

The Group call alert of indicator 23 is actuated by a flip-flop 152 triggered by an "and" gate 153. Inputs to gate 153 are from the "one" outputs of stages 138, 140, 141 and 142 and from the "zero" output of stage 139. Gate 153 will therefore open upon a count of 11101 entering register 90. Since this count represents binary equivalent of 13, it cannot occur in any word of an individual call.

Obviously many modifications and variations are possible in the light of the above teachings. It is therefore to be understood that within the scope of the appended claims, the invention may be practiced otherwise than specifically disclosed.

What is claimed is:

1. A selective calling system, comprising a transmitter, a first serial shift register including means for selecting and entering therein a particular number in the form of a plurality of binary digits, said number constituting the address of the station to be called, a clock oscillator for supplying timing signals to said first register, means for modulating the signal output of said transmitter in accordance with the serial output of said first register, a receiver including means for detecting the modulation of said transmitter signal to reproduce at the receiver the series output of said first shift register, a second clock oscillator at said receiver, means controlled by said reproduced output of said first register for synchronizing the phase said second clock oscillator with said first clock oscillator upon each appearance of a particular binary digit, a second serial shift register receiving both timing signals from said second clock oscillator and the output of said receiver detecting means for shifting said output into said second register, means for clearing said second register at the commencement of transmission by said transmitter, means for indicating the storage of a complete binary number in said second shift register, and means operable upon the storage of a complete binary number in said second register for testing said stored number against the particular binary number representing the station address and for indicating a call if the test is true.

2. Apparatus as claimed in claim 1 wherein said modulating means includes first and second tone generators, said first tone generator supplying modulating output upon the occurrence of a binary one in the output of said first shift register, said second tone generator supplying a modulating output upon the occurrence of a binary zero in the output of said first shift register and said receiver detecting means includes a first filter tuned to the frequency of said first tone generator and having a rectifier connected thereto to provide a first polarity output and a second filter tuned to the frequency of said second tone generator and having a rectifier connected thereto to provide an output of polarity opposite said first polarity.

3. Apparatus as claimed in claim 2 wherein said means for synchronizing said second clock oscillator is controlled by signals from the rectifier connected to said first filter.

4. A selective calling system, comprising a transmitter, a first serial shift register having a plural binary word capacity, means for selecting and entering in said first register a message composed of a plurality of binary words, means for modulating the signal output of said transmitter in accordance with the message content of said first register, a receiver including means for recovering the binary message conveyed by the modulated transmitter signal, a second serial shift register having a single binary word capacity, means for indicating the storage of a complete binary word in said second register, logic means providing an output upon the storage of a particular binary word in said second register, a word counter arranged to advance in count upon receipt of an output from said logic means, and means controlled by said counter for indicating the reception of a particular binary message.

5. Apparatus as claimed in claim 4 with additionally a clock oscillator for providing timing signals to said first shift register, a second clock oscillator for providing timing signals to said second shift register, and means controlled by received binary words for synchronizing said second clock oscillator with said first clock oscillator.

6. Apparatus as claimed in claim 4 wherein said modulating means includes first and second tone generators controlled by said first shift register to provide an output from said first generator to represent a binary one and an output from said second generator to represent a binary zero.

7. A selective calling system, comprising a transmitter, a first serial shift register having a plural binary word message stored therein, the first word in said register being a fixed binary number, the remaining words in said register being composed of an equal number of bits with the initial bit being a binary one, means for selecting the remaining bits of said remaining words to represent a particular binary number, a clock oscillator for shifting the binary message serially from said register, means controlled by the serial output from said register for modulating the signal output from said transmitter, a receiver, means at the receiver for demodulating said transmitter signal to provide a plural word binary message, a second serial shift register having a single binary word capacity, a word counter having a count capacity equal in number to said remaining words in said binary message, means receiving said first word of said binary message for clearing said second shift register and for setting said word counter to zero, means applying said remaining words to said second shift register, a second clock oscillator for shifting words serially through said second register, means controlled by said initial bit of said remaining words for synchronizing said second clock oscillator with said first clock oscillator, a plurality of logic circuits equal in number to the number of said remaining words of said binary message, each of said logic circuits being arranged to respond to the storage of a particular word in said second register, means inhibiting the operation of each of said logic circuits until a complete word is contained by said register, said means controlled by said counter for selectively enabling the operation of said logic circuits, means controlled by a response from said logic circuits for advancing said counter, and means for indicating a count from said counter equal in number to the number of said remaining words.

8. In a selective calling system including means for transmitting a plural word binary encoded address number; a receiver address decoder comprising a serial shift register of single binary word capacity, a plurality of "and" gates equal in number to the words of said address, means connecting said shift register to each of said gates to provide enabling inputs to said gates only upon the appearance of a particular binary number in said register, a counter for enabling said gates in succession, means for advancing said counter upon the appearance of an output from any one of said gates, and means for indicating the advancement of said counter to a number equaling the number of words in said address.

9. A selective calling system for contacting individual stations of a network according to a prearranged plural digit decimal address code, comprising a transmitting station, means at said transmitting station for converting each decimal digit of said address code into an equivalent binary word composed of a fixed number of binary bits, a first serial shift register having a binary word capacity at least equal to the number of decimal digits in said address code, means entering said binary words into said register in an order corresponding to the order of the decimal digits of said address code, means for transmitting serially bits from said register, a receiving station, a second shift register at said receiving station having a single binary word capacity, means for entering in said second register in the order of their reception the binary bits received from said transmitting station, a plurality of "and" gates equal in number to the number of digits in said decimal address code, a counter for supplying an enabling signal to said "and" gates, logic means supplying an enabling signal to said "and" gates upon the appearance in said register of a binary word equivalent to a decimal digit of said address code, means applying the output of an enabled "and" gate to said counter to advance said counter thereby supplying enabling signals to said "and" gates in an order corresponding to the order of digits in said decimal address code, and means controlled by said counter for giving an indication of the reception of all said digits of said decimal address code.

10. A selective calling system as claimed in claim 9 with additionally a clock oscillator at said transmitting station for shifting bits from said first register, a clock oscillator at said receiving station having a frequency substantially equal to the frequency of said transmitting station clock and means controlled by each reception of a particular binary digit for synchronizing the phase of said receiving station clock with said transmitting station clock.

11. A selective calling system as claimed in claim 9 with additionally a clock oscillator at said transmitting station for shifting bits from said first register, a clock oscillator at said receiving station having a frequency substantially equal to the frequency of said transmitting station clock, and means for momentarily damping said receiving station clock upon each reception of a particular binary digit, thereby synchronizing the phase of said receiving station clock with said transmitting station clock.

References Cited by the Examiner

UNITED STATES PATENTS

| | | | |
|---|---|---|---|
| 2,740,106 | 3/1956 | Phelps | 340—163 |
| 2,941,191 | 6/1960 | Tyrlick | 340—168 |
| 2,978,676 | 4/1961 | Spencer | 340—163 |
| 3,001,176 | 9/1961 | Ingham | 340—164 |
| 3,046,526 | 7/1962 | Scantlin | 340—164 |
| 3,056,109 | 9/1962 | Loposer | 340—167 |
| 3,080,547 | 3/1963 | Cooper | 340—164 |
| 3,082,404 | 3/1963 | Kihn et al. | 340—167 |

NEIL C. READ, *Primary Examiner.*

IRVING L. SRAGOW, *Examiner.*